United States Patent [19]
Katayama et al.

[11] Patent Number: 5,956,935
[45] Date of Patent: Sep. 28, 1999

[54] HIGH TENSILE STEEL FILAMENT MEMBER FOR RUBBER PRODUCT REINFORCEMENT

[75] Inventors: Masaki Katayama; Kazuo Matsumaru; Yoshiyuki Oguro, all of Dejima-mura, Japan

[73] Assignee: Tokyo Rope Manufacturing Co., Ltd., Tokyo, Japan

[21] Appl. No.: 08/751,872

[22] Filed: Nov. 18, 1996

Related U.S. Application Data

[63] Continuation of application No. PCT/JP96/00634, Mar. 14, 1996, abandoned.

[30] Foreign Application Priority Data

Mar. 17, 1995 [JP] Japan ................................ 7-084568
Mar. 4, 1996 [JP] Japan ................................ 8-070870

[51] Int. Cl.⁶ .................................................. D02G 3/36
[52] U.S. Cl. ........................ 57/902; 57/212; 57/218; 57/237; 152/527
[58] Field of Search ........................ 72/286; 57/902, 57/212, 218, 237, 211; 152/527; 148/598, 599

[56] References Cited

U.S. PATENT DOCUMENTS

| | | | |
|---|---|---|---|
| 4,176,513 | 12/1979 | Young et al. | 57/218 |
| 4,545,190 | 10/1985 | Rye et al. | 57/902 |
| 4,653,259 | 3/1987 | Ogino | 57/218 |
| 4,683,175 | 7/1987 | Bakewell et al. | 57/902 |
| 4,709,544 | 12/1987 | Charvet | 57/212 |
| 5,109,661 | 5/1992 | Okamoto et al. | 57/210 |
| 5,141,570 | 8/1992 | Yutori et al. | 148/320 |
| 5,261,974 | 11/1993 | Hyodo et al. | 148/320 |
| 5,338,380 | 8/1994 | Yutori et al. | 148/532 |
| 5,605,036 | 2/1997 | Onuma et al. | 57/218 |

FOREIGN PATENT DOCUMENTS 5-195457  8/1993  Japan .................................... 57/902

*Primary Examiner*—William Stryjewski
*Attorney, Agent, or Firm*—Michael J. Striker

[57] ABSTRACT

The steel wire is made using a carbon steel wire rod material containing 0.70 to 0.75 wt % carbon and has the characteristics that its diameter is 0.10 to 0.40 mm and $Y \geq -1960d + 3580$ [Y: tensile strength (N/mm²), d: diameter (mm)]. Furthermore, the torque decrease factor of the steel wire is less than 7% in a torsion-torque curve in a torsion-torque test wherein forward twisting and then reverse twisting are applied. A preferred steel cord has two steel wires bundled together substantially in parallel and one steel wire is wound around this bundle. This steel cord is made from steel wires having the diameter, tensile strength and toughness characteristics set forth above, and also the ratio B/A of the strength B of the twisted steel cord to the aggregate strength A of the steel wires before they are twisted together into the steel cord is 0.935 or over.

9 Claims, 8 Drawing Sheets

FIG. 3-A
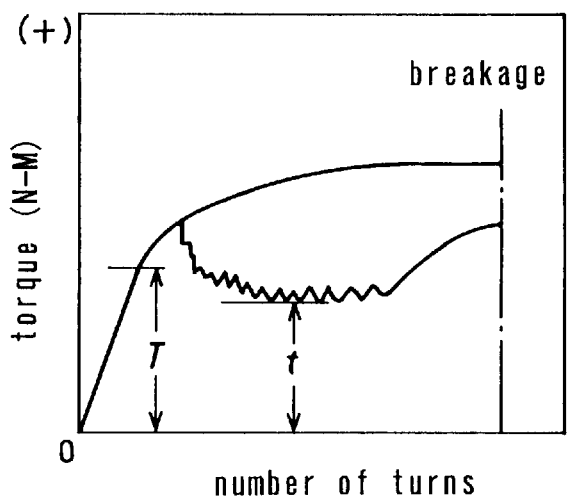
FIG. 3-B
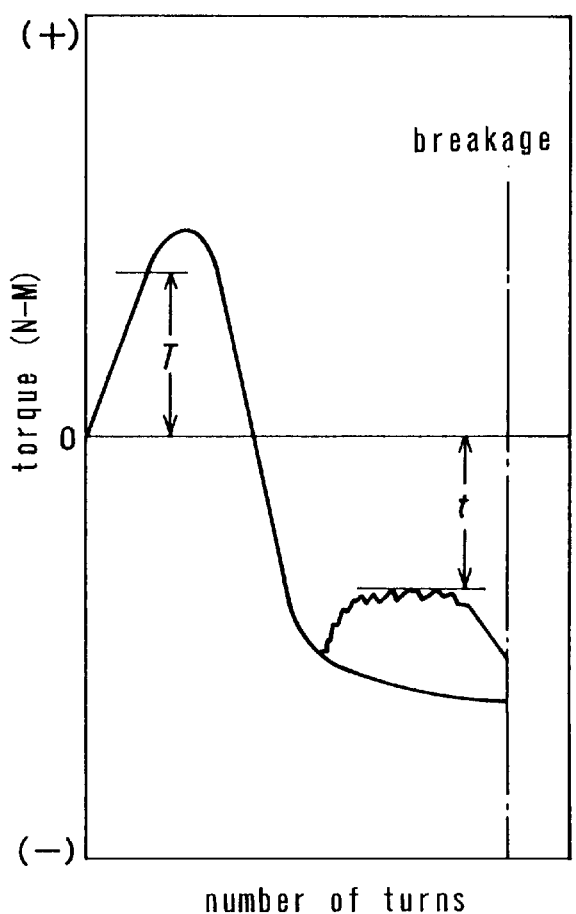

FIG. 5-A
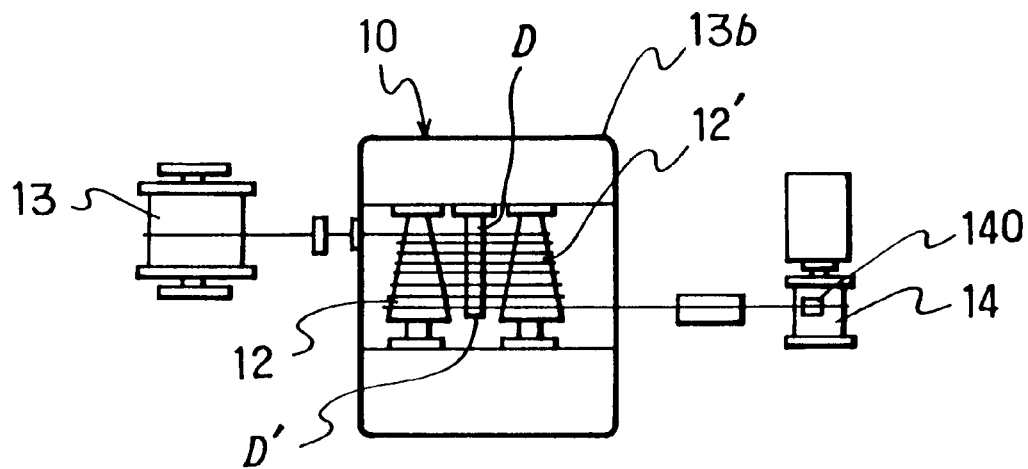
FIG. 5-B
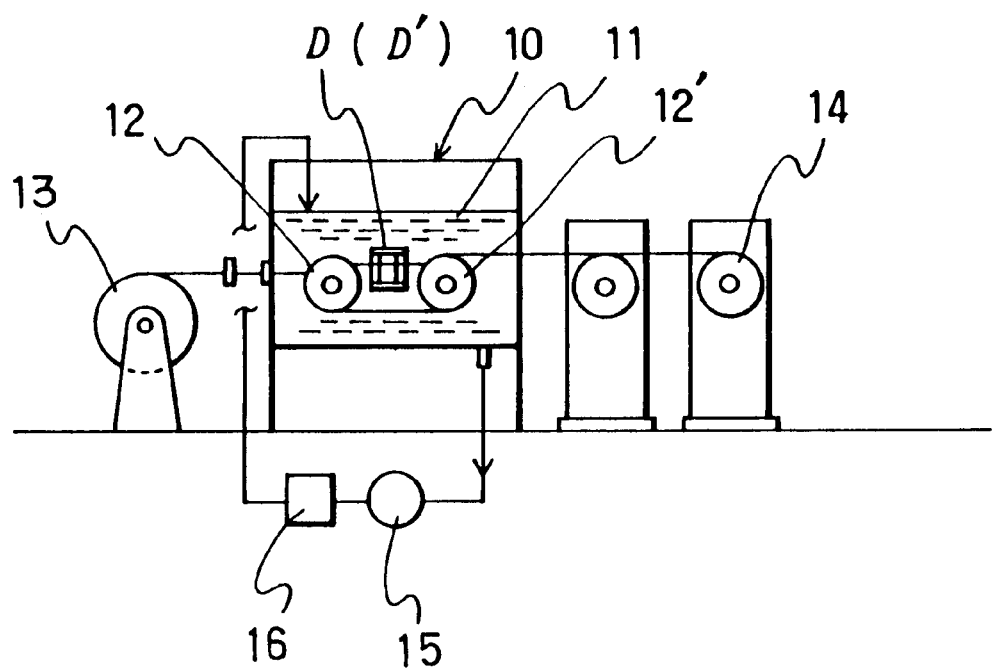

FIG.10-A
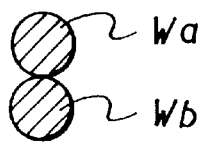
FIG.10-B
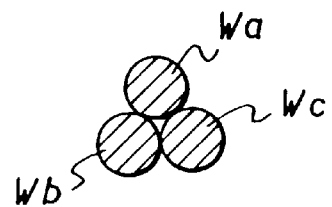
FIG.10-C
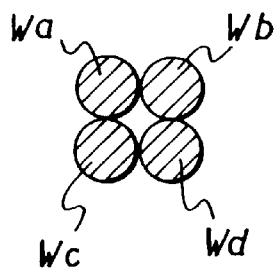
FIG.10-D
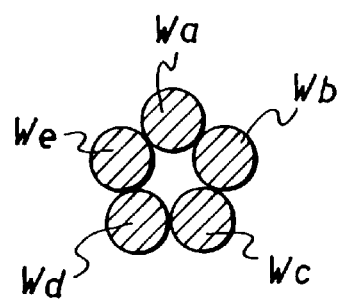
FIG.10-E
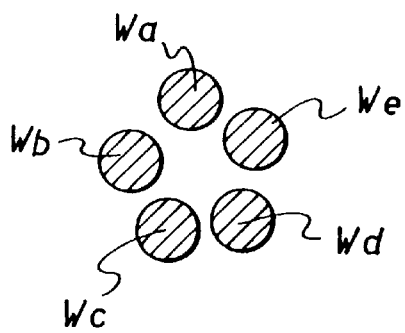
FIG.10-F
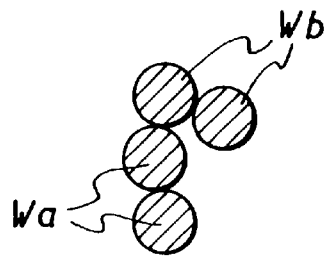

HIGH TENSILE STEEL FILAMENT MEMBER FOR RUBBER PRODUCT REINFORCEMENT

This application is a continuation of PCT/JP96/00634 filed Mar. 14, 1996, now abandoned.

FIELD OF THE INVENTION

This invention relates to a high-strength, high-performance and cheap steel filament member ideal for reinforcing rubber products such as car tires and conveyor belts.

BACKGROUND OF THE INVENTION

Steel filament members are used as reinforcing materials in various rubber products such as radial car tires, conveyor belts and high-pressure hoses.

This 'steel filament member' includes steel wires or steel filaments (hereinafter called steel wires) 0.10 to 0.40 mm in diameter and plated with brass to improve the adhesion of rubber thereto and steel cords of various structures made by twisting together a plurality of these steel wires. Hereinafter, in this invention, when both steel wires and steel cords are being referred to, the term steel filament member will be used.

Conventionally, steel wires have generally been made from a carbon steel wire rod material containing 0.70 to 0.75 wt % carbon, and in relation to the wire diameter d (mm) the tensile strength Y (N/mm$^2$) has been Y≧−1960d+3290, as shown in FIG. 1.

However, recently, lightening of rubber products has been being demanded. For example in the case of car tires, lightening is being demanded for the sake of fuel economy. As a way of achieving this, increasing the strength of steel cords and steel wires constituting them used in large amounts as a reinforcing material in rubber products and reducing the amount used per unit is effective. For example, a high tensile steel wire of diameter 0.25 mm and tensile strength over 3090N/mm$^2$ or diameter 0.35 mm and tensile strength over 2890N/mm$^2$ is suitable.

Conventionally, such high tensile steel wires have generally been made by drawing a high carbon steel wire rod material containing over 0.80 wt % carbon. For example, in the case of a carbon steel wire rod containing 0.82 wt % carbon, a steel wire of the above-mentioned strength has been made by drawing the rod to a total area percentage reduction of about 96.0 to 97.0%.

The reason why a high carbon steel has been used is that when a carbon steel wire rod material whose carbon content is 0.70 to 0.75% is used, because the strength of the starting wire rod material itself is low, the strength of the wire after final heat treating is carried out also naturally is lower than that of one having a high carbon content. Therefore, to obtain a steel wire of the same strength as a steel wire manufactured with a high carbon steel wire rod material it is necessary to adopt a particularly high area percentage reduction (degree of working) in the drawing process.

However, when such a high degree of working is adopted, although the strength of the steel wire increases as a result of work hardening, on the other hand, defects arise inside the steel wire and consequently sometimes its toughness deteriorates and its tensile strength falls. As a result, problems arise such as that breakage occurs during the drawing process and it is not possible to carry out a predetermined working or that, even if a steel wire of the target strength is obtained, breakage occurs frequently in the step of twisting together a plurality of filaments of the steel wire to make a steel cord and consequently it is not possible to make the steel cord.

Also, when the steel wire is used as a reinforcing material for a high-pressure hose, there has been the problem that the steel wire breaks and trouble consequently arises during a forming process for giving the steel wire a spiral form or during knitting of the steel wire into a braid in the process of molding the hose.

For reasons such as this it has not been possible to manufacture the kind of high tensile steel wire shown in FIG. 1 obtained with a high carbon steel wire rod material containing over 0.80 wt % carbon when using a carbon steel wire rod material whose carbon content is 0.70 to 0.75 wt %.

Accordingly, high carbon steel wire rod materials of carbon content over 0.80 wt % have been used to obtain the required strength characteristics, but using a high carbon steel wire rod material whose carbon content is over 0.80 wt % inevitably increases raw material costs. Furthermore, there has been the problem that the higher the carbon content is the more segregation tends to occur during the steel-making process, and also in the process of manufacturing a steel wire by working the obtained starting wire rod material the heat treatment becomes difficult and the adverse influence of non-metallic inclusions in subsequent drawing and twisting steps is large.

Explaining this further, the above-mentioned 'toughness' of the steel wire is extremely important. The reason for this is that when deterioration in toughness exceeds a certain limit, as well as the processing-related problems mentioned above occurring, the fatigue resistance also falls sharply. Furthermore, the problem of toughness of a steel wire is also related to the demand for cost reduction. That is, as a cost-reducing measure, it is effective to reduce the number of steel wires constituting a steel cord and adopt a simple structure such as for example a 1×3 structure. However, when the number of steel wires is reduced, to maintain a required strength of the steel cord it is necessary to increase the diameter of the steel wires in addition to raising the strength of the steel wires. But when the diameter of a steel wire is large, due to the filament diameter effect its fatigue resistance with respect to bending falls greatly. To solve this problem it is essential that the steel wire have good toughness.

However, hitherto, there has not been a measure by which it is possible to correctly determine the toughness of a manufactured steel wire. That is, the toughness of a steel wire has generally been evaluated by the number of turns (the twist value) until the steel wire breaks when it is twisted in one direction. However, in practice, even when steel wires having substantially the same twist value are used there has often been dispersion, such as in whether problems like breakage occur or do not occur in the process of twisting together steel wires to make a steel cord. Thus, determinations of toughness limits have lacked reliability. However, correct determination of toughness using other characteristics instead of this as parameters, namely elongation and contraction values on breaking, has been problematic.

SUMMARY OF THE INVENTION

Accordingly, a first object of the invention is to provide a steel filament member for rubber product reinforcement which is high-strength and also has good toughness and fatigue resistance and with which it is possible to achieve suitable weight reduction and fatigue resistance improvement of rubber products while using a cheap carbon steel wire rod material.

A second object of the invention is, in addition to the first object, to provide a new steel cord for rubber product reinforcement which while being of a simple structure makes it possible to realize efficiently a strength equal to or better than that of a conventional high tensile steel cord, which allows rubber to penetrate fully into its center (has good corrosion resistance) and which can also display excellent fatigue resistance even when the diameter of the steel wires of which it is made is large.

A third object of the invention is to provide a radial tire which has a long life and can be made lightweight.

A steel cord according to the invention is also suitable for use as a reinforcing material of various other rubber products, such as conveyor belts and high-pressure hoses.

An aspect of the invention achieving the above-mentioned first object provides a high tensile steel wire for rubber product reinforcement made by heat treating and plating and then drawing a carbon steel wire rod material containing 0.70 to 0.75 wt % carbon and a steel cord made using a plurality of these steel wires, wherein:

(1) the diameter of the steel wire is 0.10 to 0.40 mm;
(2) the steel wire has a tensile strength satisfying the following equation:

$Y \geq -1960d + 3580$ [Y: tensile strength (N/mm$^2$), d: diameter (mm)]; and (3) the torque decrease factor of the steel wire is less than 7% in a torsion-torque curve in a torsion-torque test wherein forward twisting and then reverse twisting are applied.

This steel cord includes all those having a 1×n structure, an n+m structure such as a 2+2 structure, or a structure comprising a 1×n structure as a core and a plurality of steel wires twisted around this.

An aspect of the invention achieving the above-mentioned second object provides a steel cord made using three high tensile steel wires for rubber product reinforcement made by heat treating and plating and then drawing a carbon steel wire rod material containing 0.70 to 0.75 wt % carbon, wherein:

(1) two of the steel wires are bundled together substantially in parallel and one steel wire is wound around this bundle;
(2) the diameter of the steel wires is 0.20 to 0.35 mm;
(3) each of the steel wires has a tensile strength satisfying the following equation:

$Y \geq -1960d + 3580$ [Y: tensile strength (N/mm$^2$), d: diameter (mm)];

(4) the torque decrease factor of each of the steel wires is less than 7% in a torsion-torque curve in a torsion-torque test wherein forward twisting and then reverse twisting are applied; and
(5) the ratio B/A of the strength B of the twisted steel cord to the aggregate strength A of the steel wires before they are twisted together into the steel cord is 0.935 or over.

In this steel cord, preferably, with respect to the diameter d (mm) of the steel wires, the cord twisting pitch is 40d to 65d.

The above-mentioned high tensile steel wire is preferably made by wet drawing with the following conditions:

(1) a drawing die whose approach angle (2α) is 8 to 10° and whose bearing length is 0.3d$_1$ (d$_1$=drawing hole diameter) is used;
(2) final drawing is carried out using a double die comprising two drawing dies lined up in series and a skin pass of drawing area percentage reduction 1.2 to 3.9% is carried out by the exit side die;
(3) drawing dies having sintered diamond nibs are used at least for the two dies of the double die and a plurality of drawing dies upstream thereof, the use of alloy nibs for the drawing other dies being permissible; and
(4) the steel wire temperature immediately after passing through the final drawing die is controlled to below 150° C.

An aspect of the invention achieving the above-mentioned third object provides a radial tire for a car wherein any of the steel cords described above is used to reinforce a belt part.

BRIEF DESCRIPTION OF THE DRAWINGS

FIG. 3-A is a one-way torsion-torque curve graph;

FIG. 3-B is a forward-reverse torsion-torque curve graph applied in the invention;

FIG. 5-A is a plan view schematically showing a wet drawing process of the invention;

FIG. 5-B is a sectional view schematically showing a wet drawing process of the invention;

FIGS. 10-A through 10-F are schematic enlarged sectional views of examples of other steel cords in which steel wires of the invention are applied.

DETAILED DESCRIPTION OF THE PREFERRED EMBODIMENTS

The invention will now be described in detail.

Figure 8:
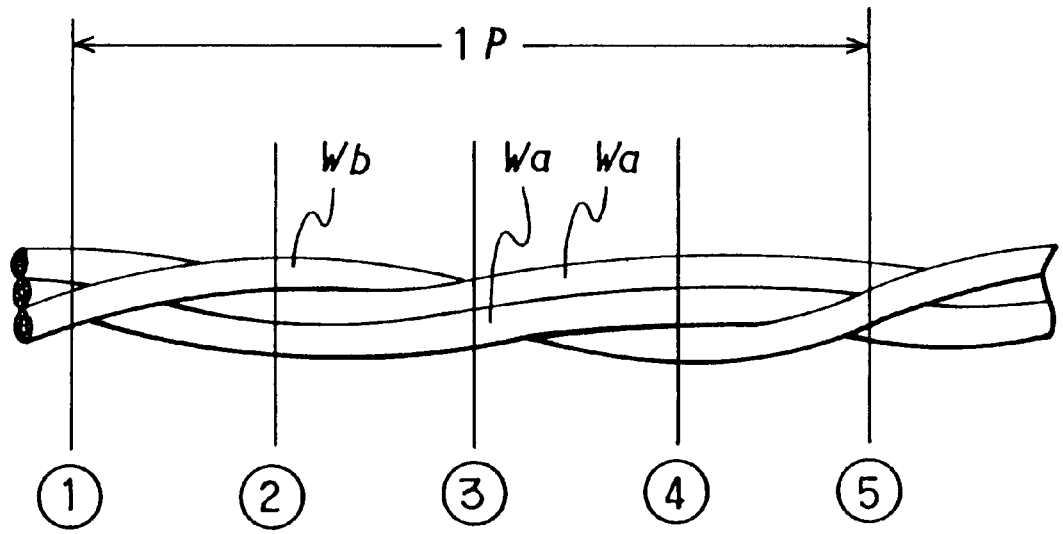
FIG. 8 is a side view showing enlarged a part of a preferable steel cord of the invention.
Figure 9:
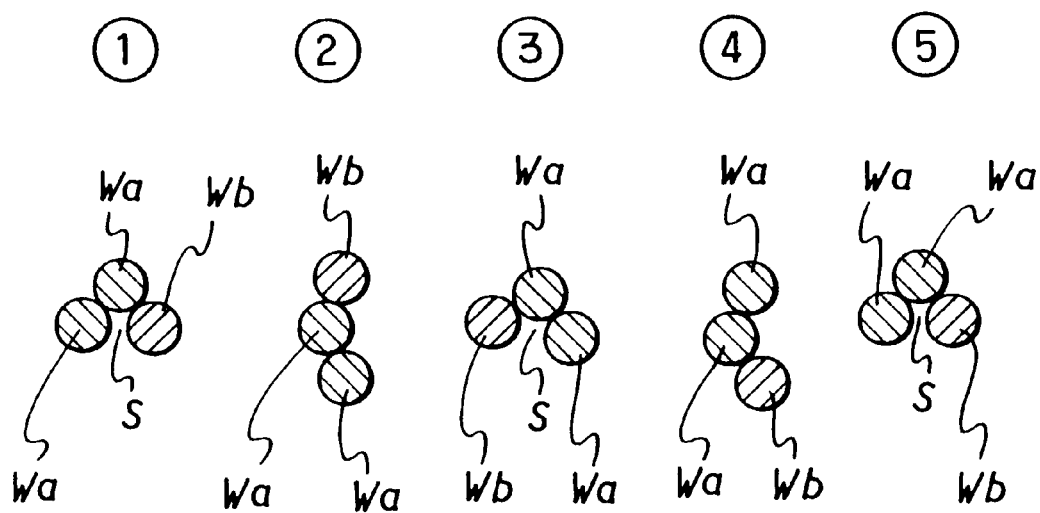
FIGS. 9(1) through 9(5) are schematic enlarged sectional views of one pitch length of the steel cord of FIG. 8 cut at five locations.

FIG. 8 and FIG. 9 show an example of a preferable steel cord of the invention. In the steel cord in this example, three steel wires of the same diameter are used. The steel wire diameter d is generally suitably selected from the range 0.10 to 0.40 mm, and more preferably from the range 0.25 to 0.35 mm.

Of these three steel wires, two steel wires Wa, Wa are bundled substantially in parallel and one steel wire Wb is wound around this bundle in a spiral, producing an overall 2+1 structure. In this example the two steel wires Wa, Wa are always in contact, but the invention is not limited to this and there may be parts extending in the length direction where the two wires are apart from each other.

FIG. 9 schematically shows the cross-sectional shape of this steel cord at five locations dividing one pitch length of the steel cord into four equal sections. Because the steel wire Wb is wound around the two steel wires Wa, Wa bundled substantially in parallel, there are no closed-contour cross-sections where the three steel wires Wa, Wa, Wb are each in contact with both of the other two, and a gap s reaching the center of the cord exists in the cross-section at all points along the cord. Therefore, the area of adhesion between the steel wires and the rubber is large, almost all the surfaces of the filaments of the cord can adhere to the rubber and the separation resistance of the cord is excellent.

Also, because the two steel wires Wa, Wa are bundled substantially in parallel, the strength decrease caused by these steel wires being twisted into a cord is small. Furthermore, because structurally it is possible to make the twisting pitch P long within a range such that the cord does not come apart and the strength utilization of the steel wires is good, it is possible to obtain a steel cord of very high strength.

Also, the ratio (B/A) of the cord strength B of the twisted steel cord to the aggregate strength A of the three steel wires Wa, Wa and Wb before they are twisted together into the cord is 0.935 or over. This is, in other words, adopting a twisting efficiency such that twisting losses are small; when B/A is less than 0.935, even if the tensile strength of the steel wire satisfies the conditions discussed below, the strength of the twisted cord is insufficient.

Also, the twisting pitch P of the cord, i.e. the pitch at which the steel wire Wb is wound, is preferably in the range of 40 to 65 times the steel wire diameter d. When the cord twisting pitch P with respect to the steel wire diameter d is less than 40d, the pitch is too short and the twisting efficiency (B/A×100%) is low and a tendency for the rubber penetration to fall can be seen. When on the other hand a long twisting pitch P exceeding 65d is adopted, the cord comes apart easily.

FIG. 10-A through FIG. 10-F show examples of other steel cords to which the invention is applied. FIG. 10-A shows a 1×2 structure made by twisting together two steel wires Wa, Wb. FIG. 10-B shows a 1×3 structure made by twisting together three steel wires Wa, Wb and Wc simultaneously. FIG. 10-C shows a 1×4 structure made by twisting together four steel wires Wa, Wb, Wc, and Wd simultaneously, and FIG. 10-D shows a 1×5 structure made by twisting together five steel wires Wa, Wb, Wc, Wd and We simultaneously.

FIG. 10-E shows a 1×5 loose open structure made by carrying out an excessive forming on five steel wires Wa, Wb, Wc, Wd and We before they are twisted together and then simultaneously twisting these steel wires together loosely. FIG. 10-F shows a 2+2 structure wherein four steel wires Wa, Wa Wb, Wb are used in two sets of two, one set of steel wires Wa, Wa, being bundled substantially in parallel and the other set of steel wires Wb, Wb being wound around this.

A steel cord of the invention may thus be of a 1×n structure or an n+m structure, which includes 2+3 and 3+3 structures not shown in the drawings, and also includes multi-layer structures wherein a plurality of steel wires are wound around a 1×n structure, such as 1×3+6 structures. Because these steel cords also use steel wires clearing a torque decrease factor in a special toughness limit determination test which will be further discussed later, they can have high strength and display excellent fatigue resistance characteristics.

The steel wires Wa, Wb, Wc, Wd and We (hereinafter called W) are made by using a carbon steel wire rod material containing 0.70 to 0.75 wt % carbon, drawing this to a predetermined intermediate diameter, carrying out heat treatment and plating, and then drawing again, and their tensile strength Y before being twisted together is a high strength satisfying $Y \geq -1960d+3580$ (N/mm$^2$). With a tensile strength Y before twisting of $Y < -1960d+3580$ (N/mm$^2$), the difference between the steel wire W and a conventional steel wire would be small and the steel wire W would not have an effect of making possible tire weight reduction through increased steel cord strength.

The reason for making the lower limit of the carbon content of the carbon steel wire rod material 0.70 wt % is that with an amount of carbon smaller than this, even if ideal final drawing conditions are employed, it is not possible to obtain a tensile strength $Y \geq -1960d+3580$ (N/mm$^2$). The reason for making the upper limit 0.75 wt % is that with an amount of carbon greater than this there are problems such as increased cost. The upper limit of the strength level, for reasons related to carbon content, is normally $-1960d+3920$ (N/mm$^2$).

As a specific composition, one example is a carbon steel consisting of, by weight, C: 0.70 to 0.75%, Si: 0.12 to 0.35%, Mn: 0.3 to 0.9% and a remainder of Fe and unavoidable impurities; however, predetermined amounts of Cr and Ni or the like may be added to this basic composition as alloying elements.

Also, a steel wire W of the invention has good toughness before twisting and after twisting. That is, specifically, in a continuous torsion-torque curve obtained in a torsion test wherein forward twisting and then reverse twisting are applied, the decrease in the torque value until breakage is 7% or less.

Explaining this in detail, as mentioned above, hitherto there has not been a suitable evaluation method or measure for evaluating toughness, and toughness has been evaluated by the number of turns until breakage when a steel wire is gripped at a predetermined spacing and twisted in a fixed direction while a light tension is applied to the steel wire in the axial direction. With respect to this, in this invention, as a means for determining toughness, a torsion test wherein forward and reverse twisting are applied is employed and the toughness is deemed good if the torque decrease factor in a torsion-torque curve obtained in this test is 7% or less.

Figure 1:
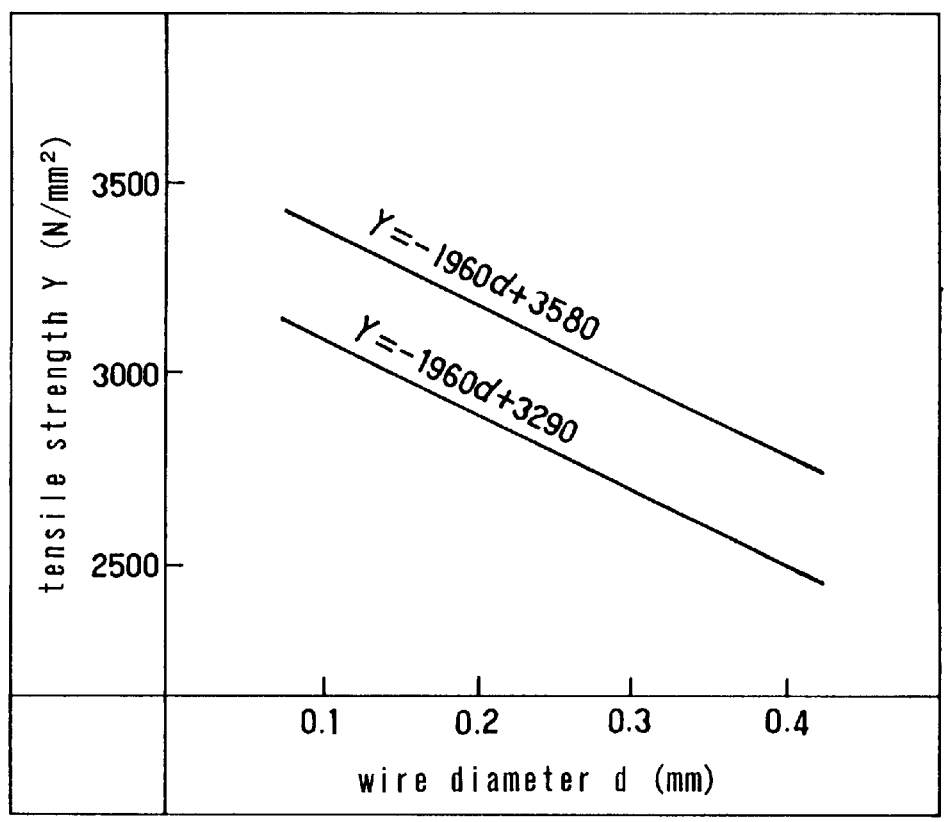
FIG. 1 is a graph showing relationships between the diameter and the tensile strength of steel wires made using steel wire rod materials having different carbon contents.
Figure 2:
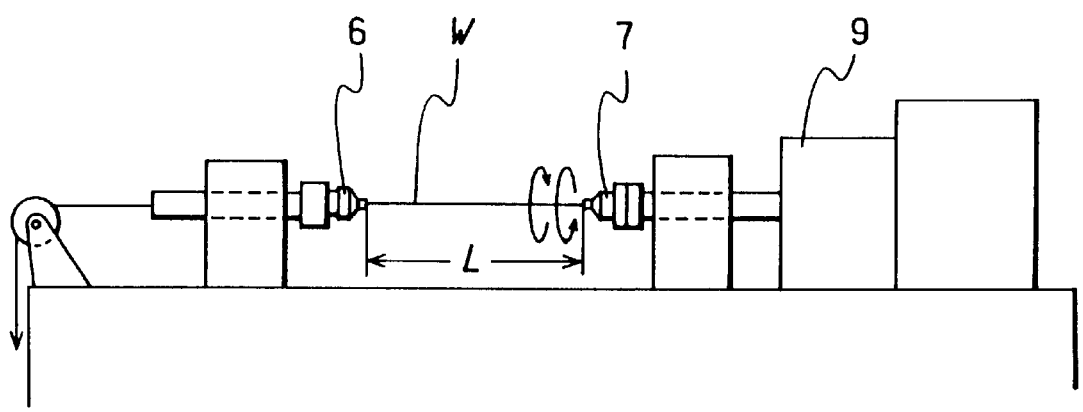
FIG. 2 is a side view of a test apparatus illustrating a torsion-torque test method for evaluating toughness according to the invention.

In the toughness determination method in this invention, specifically, as shown in FIG. 2, the steel wire W is held by a fixed side chuck 6 and a moving side chuck 7 set a predetermined spacing L apart and a tension is lightly applied in the axial direction of the steel wire as shown with an arrow by a weight being suspended from the steel wire extending from the fixed side chuck 6. Then, the steel wire W between the chucks is twisted by the moving side chuck 7 being rotated through a predetermined number of turns at a fixed speed in a fixed direction (for example clockwise) by a motor 9; the rotation of the moving side chuck 7 is then stopped and then twisting in the opposite direction (for example counterclockwise) is carried out and a torsion-torque curve until the steel wire breaks is taken.

When a torsion-torque curve of one-way twisting is measured, as shown in FIG. 3-A, there are steel wires with which the torque decreases before breakage is reached with the torque describing a normal curve rising continuously to the right. This torque decrease is thought to occur as a result of cracks entering through minute faults formed inside the steel wire by the drawing process. However, when a steel wire with which a torque decrease is not seen in this one-way torsion test is actually used and twisted, there have been many cases wherein breakage occurs, the strength reduction of the cord is large and the fatigue resistance is also insufficient, and therefore toughness determination by this test has been inadequate and inaccurate.

For this reason, the present inventors carried out forward-reverse twisting and took resulting torsion-torque curves for numerous steel wires of different diameters and materials, as shown in FIG. 3-B. As a result, it was found that steel wires with which the torque decrease factor in this forward-reverse torsion test also is below 7% have sufficiently high strength, their toughness is also good and the decrease in their strength when twisted into a cord is also small, and their fatigue resistance is also good. On the other hand, steel wires with which although no torque decrease appeared in the one-way only torsion test the torque decrease factor in the reverse twist step of the forward-reverse torsion test was 8% or over had clearly inadequate toughness, suffered breakage in the cord-twisting process and furthermore had poor twisting efficiency, and the steel cords obtained did not satisfactorily utilize the strength of the steel wires and could not be said to have sufficient fatigue resistance either.

If in the torsion-torque curve of FIG. 3-B the torque value at the elastic limit of torsion in the initial forward twist, i.e. the upper limit of the linear portion rising to the right in the graph, is written T and the minimum torque value of the decreased torque part in the reverse twisting is written t, the above-mentioned torque decrease factor $\Delta T$ is expressed by the following equation. When there is no torque decrease, t is made t=T.

$$\Delta T=[(T-|t|)/T]\times 100 \ (\%)$$

With steel wires exhibiting a torque decrease factor of over 8%, the above-mentioned problems arise, but with other steel wires the toughness is adequate and they are suitable as reinforcing materials when made into steel cords also.

By employing this parameter, it is possible to obtain a steel wire having both high strength and toughness, which exhibits low strength decrease when twisted into a cord (has high twisting efficiency), so that its strength can be fully utilized, and which furthermore in fatigue resistance also is greatly superior to conventional steel wires and steel cords.

Next, a method for manufacturing a steel wire having the above-mentioned characteristics will be described.

Figure 4:
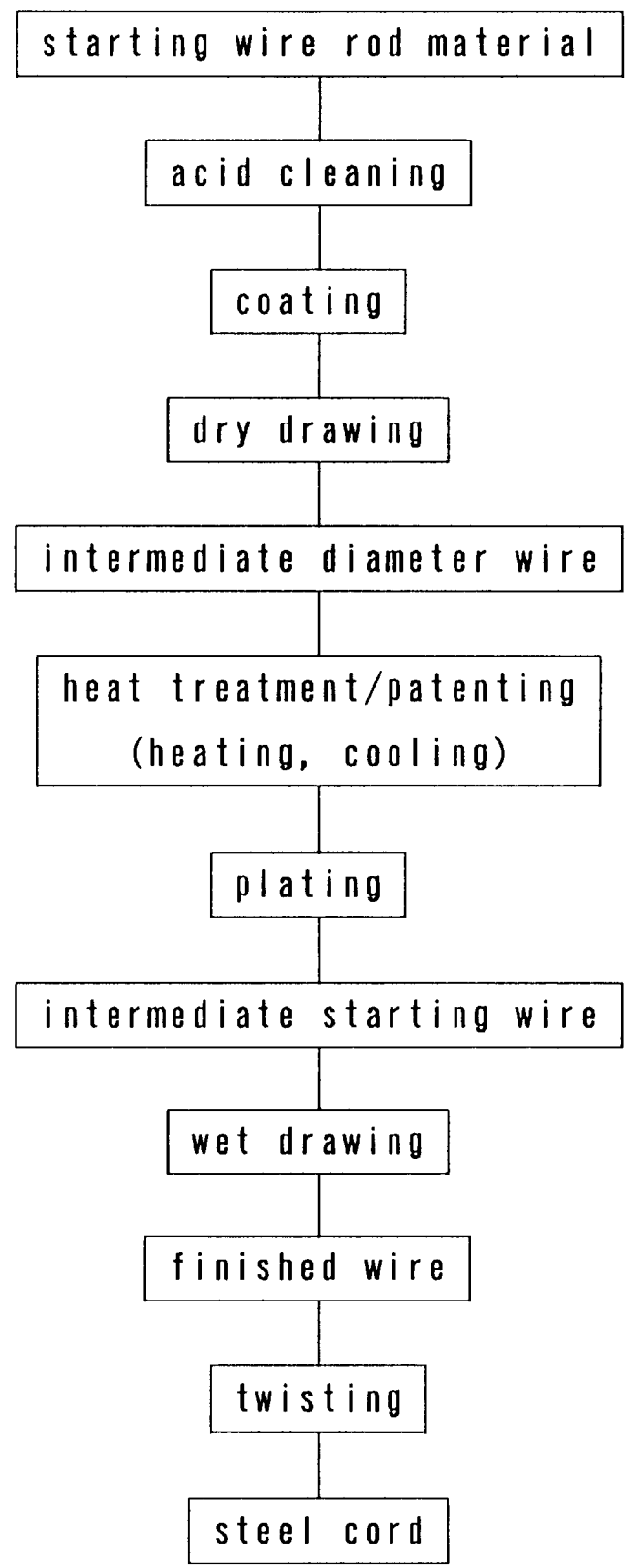
FIG. 4 is a flow chart showing a manufacturing process of a high tensile steel wire according to the invention.

FIG. 4 shows this manufacturing process; as the above-mentioned carbon steel wire rod material containing 0.70 to 0.75% carbon, one whose diameter is 4.0 to 5.5 mm is used.

In a starting material drawing process, a starting wire rod material is cleaned with acid, coated and continuously dry-drawn (using a powder-form lubricant) to reduce its diameter to for example a range of 1.2 to 2.3 mm, whereby an intermediate diameter steel wire is obtained.

Then, a heat treatment and plating process (in the case of brass plating) or a heat treatment-plating-plating diffusion process (in the case of plating of copper and zinc in two layers) is carried out.

The heat treatment is carried out using a for example gas direct flame type heating oven, and here the intermediate diameter steel wire is heated to 900 to 960° C. for a predetermined time and thereby made into austenite. The intermediate diameter steel wire is then fed into a patenting oven which cools it with heated fluidized sand or molten lead, and here the steel wire is quenched to about 500 to 560° C. and thereby transformed into pearlite.

In a final heat treatment (patenting treatment), the material is given a uniform, fine pearlite structure including no extraneous structures such as bainite or the like. The strength of the wire at this time is preferably made about 1100 to 1200N/mm².

Next, this intermediate diameter steel wire is electrolytically acid-cleaned in a plating pre-treatment tank and an oxide film is thereby removed from the surface of the steel wire. The steel wire is then passed through an electroplating tank and directly brass-plated or predetermined amounts of copper plating and zinc plating are sequentially carried out to form a double-layer plating.

In the latter case, the plated steel wire is either passed through a diffusing oven using heated fluidized sand or is heated by an electric current being passed through it, whereby the copper and zinc components of the plating are diffused into each other and become brass. After that, it is cooled to produce a final starting steel wire.

In this diffusion treatment, heating for a predetermined time at about 600° C. is carried out, but because when there is a lot of β brass the subsequent drawability of the wire is poor, conditions such as the heating time and temperature are preferably set so that there is as much a brass as possible within a limit such that the strength of the steel wire does not fall.

The plated final starting material steel wire manufactured in this way is drawn to a target diameter in the range 0.10 to 0.40 mm by means of a continuous wet drawing machine using a liquid lubricant.

In this continuous wet drawing, in this invention the following conditions are employed:

[1] Drawing dies whose approach angle ($2\alpha$) is 8 to 10° and whose bearing length is $0.3d_1$ ($d_1$=drawing hole diameter) are used.

[2] Final drawing is carried out using a double die comprising two drawing dies arranged in series and a skin pass of drawing area percentage reduction 1.2 to 3.9% is carried out by the exit side die.

[3] Drawing dies having sintered diamond nibs are used at least for the two dies of the double die and a plurality of drawing dies upstream thereof. Conventional sintered alloy nibs may be used for the other drawing dies.

[4] The steel wire temperature immediately after passing through the final drawing die is controlled to below 150° C.

This will now be described in detail. FIG. 5-A and FIG. 5-B schematically show a wet drawing process. The reference number 10 designates a lubricating liquid tank containing a lubricating liquid 11 made by dissolving an ordinary steel cord lubricant in water to a concentration of 10 to 30%. A payout reel 13 is disposed upstream of the lubricating liquid tank 10, and a traverser 140 and a takeup reel 14 for taking up a steel wire constituting a final product are disposed on the downstream side of the lubricating liquid tank 10.

A pair of capstans 12, 12' are rotatably mounted in parallel and so that they are both submerged in the lubricating liquid 11, and the downstream side capstan 12' is driven by a variable speed motor not shown in the drawings. A plurality of drawing dies D are disposed between the pair of capstans 12, 12', and a steel wire set in grooves in the capstans 12, 12' is drawn by being sequentially passed through the drawing dies D.

A circulating pump 15 and a cooler 16 are disposed outside the lubricating liquid tank 10 as part of a circulating system which forcibly removes lubricating liquid from the tank, cools it and returns it to the tank, whereby during wet drawing operation the lubricating liquid 11 is temperature-controlled to below 40° C. and preferably to 30 to 35° C. The speed of the wire in the wet drawing is made over 500 m/min, but by lubricating liquid temperature control and the effect of a final skin pass drawing it is possible to keep the temperature of the finished steel wire to below 150° C.

Figure 6:
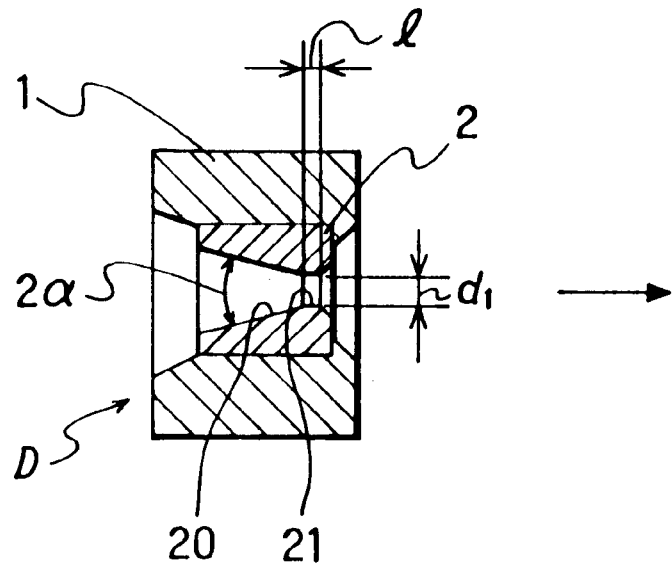
FIG. 6 is a sectional view of a drawing die used in the invention.

FIG. 6 shows a drawing die (including a double drawing die for finishing which will be further discussed later) used in the wet drawing process. The reference number 1 designates a die comprising a nib 2. The approach angle $2\alpha$ of an approach part 20 of the nib 2 is 8 to 10° and the length l of a bearing part 21 of the nib 2 is $0.3d_1$.

Explaining the reasons for these limits, conventionally, an approach angle of 12° is generally employed because this results in the lowest drawing force during drawing; however, in this invention, the approach angle is made smaller than this. This is to increase the degree of work hardening and raise the drawing working limit and to reduce residual stress in the wire surface and thereby increase the fatigue resistance of the wire.

The reason for increasing the degree of work hardening is that to obtain a high strength with a carbon steel material having a low carbon content it is necessary to make the overall degree of working very high, and with an approach angle of 12° the working limit would be exceeded. Accordingly, low approach angle dies of 8 to 10° are used to raise the drawing working limit and also increase the degree of work hardening per pass to relatively keep the overall degree of working low. However, an approach angle of less than 8% is not suitable because the drawing resistance of the steel wire becomes too high.

Also, the bearing length l of the die has conventionally generally been $0.5d_1$ with respect to the drawing hole diameter $d_1$, but in this invention it is set at $0.3d_1$. The reason for this is that when a bearing length of $0.5d_1$ is adopted, as is conventional, because the drawing resistance becomes large the production of heat becomes marked. In this invention the bearing length is therefore made short, and by this means it is possible to reduce the length over which the steel wire makes contact with the die and thereby moderate the drawing resistance.

By means of this balance between the bearing length and the approach angle, it is possible to reduce the drawing resistance while increasing the drawing working limit. As a result, it is possible to make the working of the surface and the inside of the steel wire uniform and also reduce residual stress in the wire surface, and even when a large overall degree of working is adopted it is possible to maintain toughness.

Figure 7:
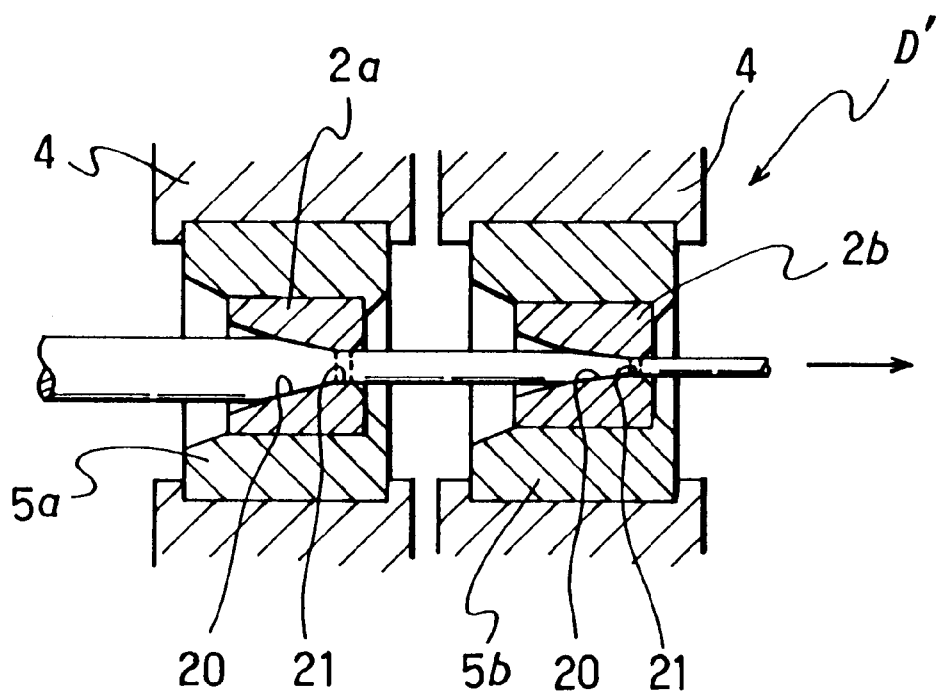
FIG. 7 is a sectional view of a finishing drawing die used in the invention.

FIG. 7 shows a double die D' for final drawing, wherein a normal die 5a and a skin pass die 5b are disposed adjacent to each other in series in casings 4, 4, and a predetermined area percentage reduction is thereby obtained in two stages. Nibs 2a, 2b of the normal die 5a and the skin pass die 5b are each made of sintered diamond and have the above-mentioned approach angle and bearing length.

In this invention, sintered diamond nibs are used in at least four dies, including the two nibs 2a, 2b of the double die D' and drawing dies upstream of this. The reasons for this are as follows:

Firstly, because the drawing hole surface of a conventional sintered alloy nib consisting of tungsten carbide or the like is rough, as well as the drawing resistance being large the surface of the steel wire becomes rough as a result of transfer from the nib surface and this has an adverse affect on the fatigue resistance of the wire. With a sintered diamond nib, on the other hand, because its surface is very smooth compared to that of a sintered alloy nib, it is possible to reduce the drawing resistance. Also, the surface of the drawn steel wire also becomes smooth and this has an effect of improving the fatigue resistance of the wire. Secondly, because sintered diamond is particularly hard it suffers almost no wear due to continuous drawing, and increase in die diameter and consequent variation in area percentage reduction caused by die wear can be prevented. Furthermore, it is possible to save die replacement labor and production stoppage time. Therefore, although diamond itself is expensive, for these reasons, viewed on the whole, it is economic to use sintered diamond nibs. Sintered alloy nibs may be used for the other drawing dies.

In this invention, a skin pass of area percentage reduction 1.2 to 3.9% is carried out using a double die as a finishing drawing die. The reason for doing this is that it makes it possible to reduce heating of the wire caused by drawing and reduce the temperature of the wire immediately after drawing by 25 to 40° C. compared to when a single die is used. Furthermore, it makes it possible to keep the residual stress in the wire surface low on the minus side.

The reason for making the drawing area percentage reduction effected by the skin pass die 5b in the range 1.2 to 3.9%, is that when this area percentage reduction is 1.1% or below the amount of working is too small and the effect of moderating residual stress is small, and also when the area percentage reduction is too large, at 4.0% or more, the effect of moderating residual stress is small.

The temperature of the lubricating liquid is kept low so that the temperature of the steel wire immediately after it passes through the final die is kept below 150° C. By this means, in combination with the use of the skin pass, it is possible to prevent brittling of the steel wire caused by ageing. As the method of keeping the temperature of the lubricating liquid low, it is sufficient if, as described above, the circulating pump 15 and the cooler 16 are provided outside the lubricating liquid tank 10 to as part of a circulating system which forcibly removes lubricating liquid from the tank, cools it and returns it to the tank, and during wet drawing operation the lubricating liquid 11 is temperature-controlled to for example below 35° C.

In this invention, by means of the above-mentioned set of dies, continuous wet drawing is carried out with the number of drawings set so that the overall area percentage reduction is 96.5 to 98.2%. The reason for this is that when the overall area percentage reduction is less than 96.5% the tensile strength of the steel wire is insufficient and when it is over 98.2% the degree of working is too great and the toughness of the steel wire deteriorates. The number of drawings is generally set to from 20 to 25 drawings.

The area percentage reduction per drawing die preferably becomes lower the later the stage of the respective die is, and by using the above-mentioned double die as a finishing die to release and substantially eliminate residual drawing stress in the surface part of the steel wire and setting the area percentage reduction of the skin pass performed by the skin pass die 5b in the finishing area percentage reduction as set forth above it is possible to obtain a suitable residual stress moderating effect.

By employing the final drawing conditions set forth above it is possible to obtain a wire filament having high strength and also superior toughness while using as the starting material a carbon steel wire rod material whose carbon content is 0.70 to 0.75% which does not increase manufacturing costs. Furthermore, because by using the drawing conditions set forth above it is possible to raise the degree of work hardening per pass and also increase the overall degree of working, it is possible to manufacture a steel wire having the above-mentioned characteristics without dispersion and stably.

Therefore, even when this steel wire is used to make a steel cord made up of only three steel wires, of the kind of which an example is shown in FIG. 8 and FIG. 9, the strength decrease resulting from the steel wires being twisted into a cord is low and the resulting steel cord also has excellent fatigue resistance.

Figure 11:
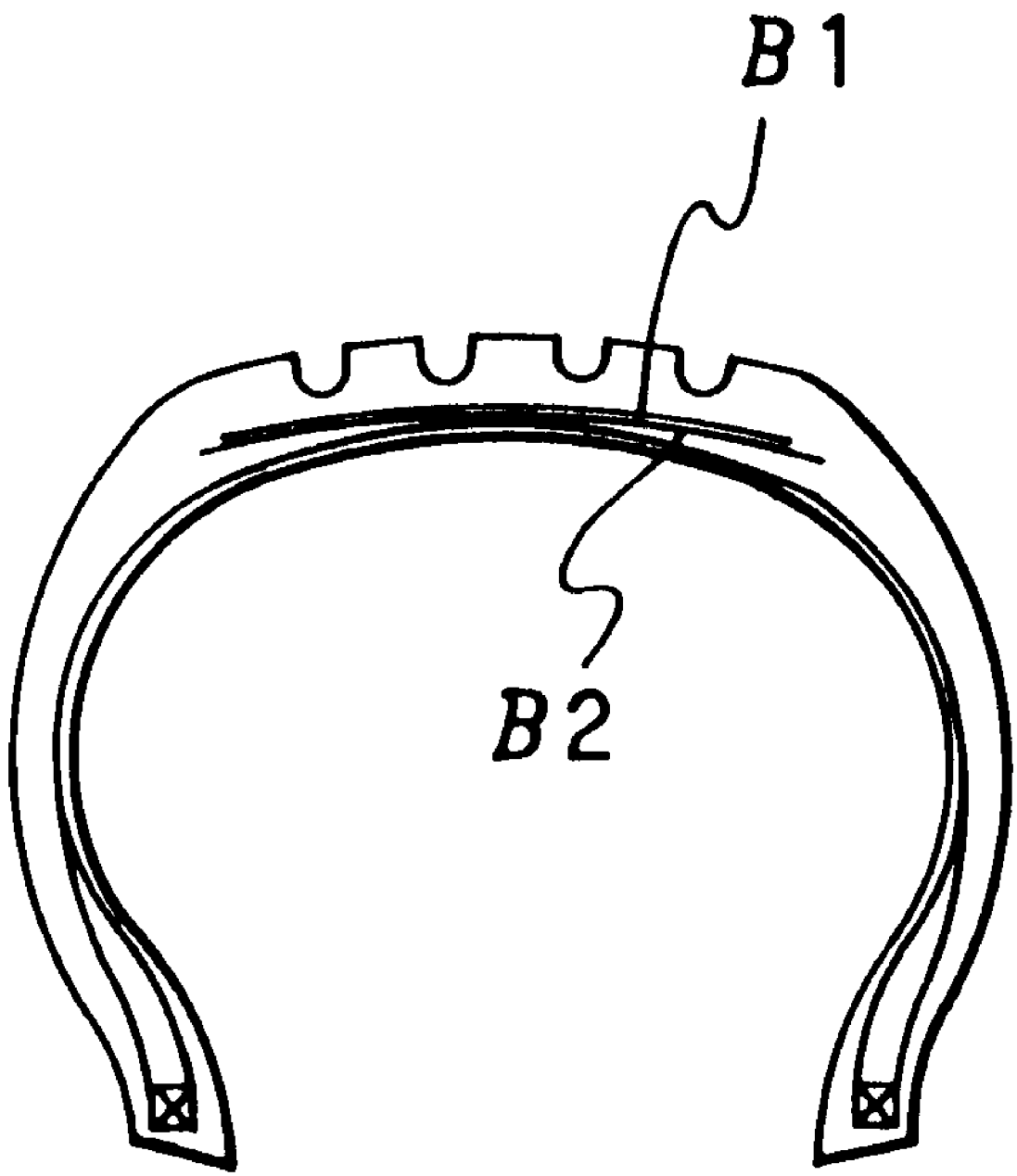
FIG. 11 is a sectional view of a radial tire for a car to which the invention is applied.

FIG. 11 shows a tire wherein a steel cord according to the invention has been used in reinforcing layers; sheet-form belt reinforcing layers B1, B2 are embedded in a belt part below the tread of the tire, and these belt reinforcing layers B1, B2 comprise steel cords disposed inside rubber sheets of a predetermined thickness and integrated with the rubber matrix. A steel cord according to the invention is used in at least one of these reinforcing layers B1, B2.

DETAILED DESCRIPTION OF THE PREFERRED EMBODIMENTS

Preferred embodiments of the invention will now be presented.

First Preferred Embodiment

1) As a starting wire, a piano wire was used. Its composition was, by wt %, C: 0.72, Si: 0.21, Mn: 0.52 and a remainder of Fe and unavoidable impurities.

This starting wire was pre-treated by acid cleaning and coating, and then dry drawn into an intermediate diameter steel wire of diameter 1.65 mm.

2) This intermediate diameter steel wire was first heated in a direct flame gas oven to about 950° C. and then quenched in an approximately 520° C. fluidized bed type patenting oven and thereby transformed into pearlite, immediately after which it was cooled with water. The tensile strength of the steel wire at this time was 1160N/mm$^2$.

Then, after being electrolytically acid-cleaned, the steel wire was passed through an electrolytic copper plating tank and an electrolytic zinc plating tank and thereby plated in two layers with copper and zinc. Plating diffusion treatment was then carried out by the intermediate diameter steel wire being heated to about 500° C. in a fluidized bed diffusion oven, and after that it was gradually cooled to produce an intermediate starting wire.

3) This intermediate starting wire was then drawn with a wet type continuous drawing machine and a steel wire of finished diameter 0.25 mm was obtained.

The lubricating liquid used at this time was an ordinary wet lubricating liquid of concentration about 10%, and was circulated through a cooler to keep the lubricating liquid temperature low and keep the temperature of the wire immediately after passing through the final die below 150° C.

4) Explaining about different samples which were made, Samples 1 to 6 were made using different conditions in the above-mentioned wet drawing, Samples 1 to 3 being within the scope of the present invention and Samples 4 to 6 being comparison examples, and Sample 7 is a C: 0.82 wt % high tensile wire made by a conventional method.

The drawing conditions and the characteristics of the respective steel wires obtained are shown in Table 1.

5) In Table 1 and also in Table 3, Table 5 and Table 6, which will be further discussed later, 'Torsion Test' refers to a conventional method wherein the chuck spacing L between the fixed side chuck 6 and the moving side chuck 7 shown in FIG. 2 is made 300d (d being the steel wire diameter) and while a tension is lightly applied in the axial direction of the wire extending from the fixed side chuck 6 the moving side chuck 7 is turned by the motor 9 at a twisting speed of 30 rpm and one-way twisting until the wire breaks is thereby carried out, and a method wherein after twisting through ten turns in one direction twisting back in the opposite direction at the same twisting speed is carried out until the wire breaks; in each case a torsion-torque curve was obtained and used to determine toughness.

A ○ under 'One-Way Torsion Test Result' or 'Forward-Reverse Torsion Test Result' indicates that the torque decrease factor $\Delta T$ was 0 to 7% (good), and a x indicates that the torque decrease factor $\Delta T$ was over 8% (not good).

6) From this Table 1 it can be seen that Samples 1, 2 and 3 had high strength and also had good toughness. With Sample 4, on the other hand, because a large die approach angle was used, the residual stress was large, consequently the toughness was not good, the fatigue limit was inferior and the tensile strength of the wire was also low. With Sample 5, because the skin pass area percentage reduction was too large, the residual stress was large and the fatigue limit was inferior. With Sample 6, because a skin pass was not used, the residual stress was high, the finished wire temperature was also high and the toughness was unsatisfactory and the fatigue limit was also markedly inferior.

7) Steel wires of Samples 1 to 3 and Samples 5 to 7 were twisted together with a bunching-type twisting machine to make steel cords of 2+2 structure for use in radial tires.

Sample 8 is a steel cord made using the steel wire of Sample 1. Sample 9 is a steel cord made using the steel wire of Sample 2. Sample 10 is a steel cord made using the steel wire of Sample 3; Sample 11 is one made using the steel wire of Sample 5; Sample 12 is one made using the steel wire of Sample 6, and Sample 13 is one made using the steel wire of Sample 7.

8) Results obtained for each cord when the twisting performance at the time the cord was made (whether or not there was trouble such as breakage), the strength and the fatigue resistance were investigated are shown in Table 2.

Terms used in Table 2 and in Table 4 and Table 7, which will be further discussed later, will now be explained.

The 'Fatigue Resistance' is the result of a test wherein one straight steel cord is embedded in unvulcanized rubber and this is then vulcanized to produce a band-shaped test piece, this is threaded through three rotatable rolls disposed in a zigzag, and with a load of 10% of the breaking load applied to the cord the rolls are repeatedly moved to the left and right to apply repeated bending to the cord and the number of repetitions until the cord breaks is measured. The figures in the tables are based on Sample 13 (a conventional cord) being made 100.

A ○ under 'Twisting Performance' indicates no problems, a $\Delta$ indicates breakage and a x indicates numerous breakages.

As is clear from this Table 2, Samples 8 to 10, which are embodiments of the invention, have strength and toughness equal to or better than the steel cord of Sample 13 (wherein C: 0.82 wt % steel wires were used), which is a conventional steel cord, and in fatigue resistance also were as good as the conventional cord. On the other hand, with Samples 11 and 12, which are comparison examples, the strength decrease resulting from twisting was large and the fatigue resistance was also inferior.

Second Preferred Embodiment

1) Using the same wire rod material as in the first preferred embodiment, an intermediate diameter steel wire of diameter 1.80 mm (tensile strength=1150N/mm$^2$) was obtained. This wire was then drawn using a wet type continuous drawing machine and a steel wire of diameter 0.30 mm was thereby made. This was made Samples 14 to 16.

With Samples 14 to 16, the lubricating liquid concentration in the wet drawing was made the same as with Sample 1, the die approach angle was made 10°, and diamond dies were used for the last four dies. The skin pass area percentage reduction was 2.5% in Sample 14, 3.5% in Sample 15 and 3.0% in Sample 16.

2) Sample 19 is a comparison example made with the same conditions as Samples 14 to 16 except that the skin pass area percentage reduction was made 4.5%. Sample 20 is a comparison example made with the same conditions as Samples 14 to 16 except that no skin pass was carried out.

3) Using the same wire rod material as for Sample 1, an intermediate diameter steel wire of diameter 1.88 mm (tensile strength=1140N/mm$^2$) was obtained. Drawing was carried out with the same conditions as for Sample 16 except for the dies, and a steel wire similarly of diameter 0.30 mm according to the invention was made. This was made Sample 17.

4) Using the same wire rod material as for Sample 1, an intermediate diameter steel wire of diameter 1.98 mm (tensile strength=1120N/mm$^2$) was obtained. Drawing was carried out with the same conditions as for Sample 16 except for the dies, and a steel wire similarly of diameter 0.30 mm according to the invention was made. This was made Sample 18.

5) A high tensile steel wire made by a conventional method using a steel wire rod material containing 0.82 wt % carbon is shown as Sample 21.

For these Samples 14 to 21, the wet drawing conditions and the characteristics of the steel wires obtained are shown in Table 3.

As is clear from this Table 3, Samples 14 to 18 had both good tensile strength and good toughness. With Sample 19 and Sample 20, on the other hand, which are comparison examples, the strength was good but the toughness was actually not good and the fatigue limit was also inferior.

6) Steel wires of Samples 16 and 18 were twisted together with a bunching-type twisting machine to make steel cords of 1×2 structure according to the invention. The steel cord made using the steel wire of Sample 16 was made Sample 22, and the steel cord made using the steel wire of Sample 18 was made Sample 23.

7) Using steel wires of Samples 19 and 20, which are comparison examples, and Sample 21, which is a conventional wire, steel cords of 1×2 structure for use in tires were made in the same way. The steel cord made using Sample 19 is Sample 24, the steel cord made using Sample 20 is Sample 25 and the steel cord made using the steel wire of Sample 21 is Sample 26. The characteristics of these steel cords are shown in Table 4.

As is clear from this Table 4, Samples 22 and 23 have strength and toughness equal to or better than the steel cord of Sample 26 made with the C: 0.82 wt % carbon steel wire rod material, and are as good as Sample 26 in fatigue resistance also.

With Sample 24 and Sample 25, on the other hand, which are comparison examples, because they lacked toughness, breakage occurred or occurred frequently in the twisting process. Also, their strength was inferior and their fatigue resistance was not good.

Third Preferred Embodiment

1) Using the same wire rod material as for Sample 1, an intermediate diameter steel wire of diameter 1.40 mm (tensile strength=1180N/mm$^2$) was obtained.

This was then drawn with a wet drawing machine to make a steel wire of diameter 0.20 mm according to the invention. This is Sample 27. In the wet drawing conditions, an ordinary wet lubricant of concentration 10% was used as the lubricating liquid. Otherwise, drawing was carried out with the same conditions as for Sample 3.

Also, for comparison, a high tensile steel wire was made by a conventional method using C: 0.82 wt % carbon steel wire rod. This is Sample 28. The characteristics and drawing conditions of Samples 27 and 28 are shown in Table 5.

2) Using the same intermediate diameter steel wire as for Sample 18, a steel wire of diameter 0.35 mm according to the invention was made with the same wet drawing conditions as Sample 3. This is Sample 29. For comparison, a steel wire also of diameter 0.35 mm was made with different conditions of bearing length and skin pass area percentage reduction. This is Sample 30. Also, a steel wire was made by drawing with the same conditions as Sample 29 except that no skin pass was carried out. This is Sample 31. Sample 32 is a high tensile steel wire made by a conventional method using a C: 0.82 wt % carbon steel wire rod.

The drawing conditions and steel wire characteristics of Samples 29 to 32 are shown in Table 6.

3) From Table 5 it can be seen that Sample 27 (according to the invention) had strength equal to or better than that of Sample 28 (conventional example) and also had good toughness. Also, from Table 6 it can be seen that the influence of the lubricating liquid temperature and the finished steel wire temperature is large and that although Samples 30 and 31, which are comparison examples, had good strength their toughness was inferior and their fatigue limits were also greatly inferior compared to Sample 32, which was a conventional example.

4) Using the steel wire of Sample 27 as core strands (1×3), and using the steel wire of Sample 29 as side strands (+6), a steel cord of 1×3+6 structure for a tire according to the invention was made with a bunching-type twisting machine. This is Sample 33.

5) Using the steel wire of Sample 27 as core strands (1×3) and using steel wires of Samples 30 and 31, which are comparison examples, as side strands (+6), steel cords of 1×3+6 structure were made with a bunching-type twisting machine. These are Samples 34 and 35 respectively. Also, a high tensile steel cord made by a conventional method using C: 0.82 wt % carbon steel wire rod is shown as Sample 36. The characteristics of these steel cords are shown in Table 7.

6) From this Table 7 it can be seen that Sample 33, which was made according to the invention, although made using a C: 0.72 wt % carbon steel wire rod material, has strength and toughness equal to or better than Sample 36, which is a conventional steel cord made from a C: 0.82 wt % carbon steel wire rod material, and also has excellent fatigue resistance.

Thus, it is clear that the steel wires of Samples 1 to 3, Samples 14 to 18 and Samples 27 and 29, which are embodiments of the present invention, despite being made using a carbon steel wire rod material whose carbon content is 0.70 to 0.75 wt %, have high strength equal to or greater than that of a high tensile steel wire whose carbon content is 0.82 wt %, and furthermore have good toughness and excellent fatigue resistance and are therefore ideal as steel wires for rubber reinforcement.

Also, because the steel cords of Samples 8 to 10, Samples 22 to 23 and Sample 33 according to the invention were made using steel wires having the above-mentioned characteristics, their rubber product reinforcing effect is excellent and yet they have the merit that they are cheap.

Fourth Preferred Embodiment

1) As a starting material, a wire rod of diameter 5.5 mm whose chemical composition by wt % was C: 0.75, Si: 0.21, Mn: 0.52 and a remainder of Fe and unavoidable impurities was used.

This starting wire was pre-treated by acid cleaning and coating, and then continuously dry drawn into an intermediate diameter steel wire of diameter 1.68 mm. This intermediate diameter steel wire was heated in a direct flame gas oven to about 950° C., quenched in an approximately 520° C. fluidized bed oven (patenting treatment), electrolytically acid-cleaned and then electroplated with predetermined amounts of copper and zinc in two layers; after that, the intermediate diameter steel wire was heated to about 500° C. in a fluidized bed diffusion oven, whereby the plating was thermally diffused and made into brass plating, and the brass-plated intermediate diameter steel wire thereby obtained was used as a final starting material.

2) This final starting material was continuously wet drawn to make steel wires of diameter 0.28 mm.

Steel wires were made with different drawing conditions of this time (however, in all cases the temperature of the steel wire immediately after passing through the final die was controlled to below 150° C. as measured by a running filament temperature measuring instrument).

Steel cords of 2+1 structure were made with a bunching-type twisting machine using three of these steel wires, and these are Samples 37 to 41 (according to the invention) and Samples 42 to 44 (comparison examples). Also, using the same starting material a steel wire of conventional strength was made by a conventional method and made into a steel cord as Sample 46.

Further, as a comparison example, a high tensile steel wire and a cord (conventional examples) were made by a conventional method using a starting wire rod material of diameter 5.5 mm and chemical composition, by wt %, C: 0.83, 0.21, Mn: 0.50 and a remainder of iron and unavoidable impurities. This was made Sample 45.

The manufacturing conditions and steel wire characteristics and cord characteristics of these samples are shown in Table 8.

Fifth Preferred Embodiment

1) A steel wire of diameter 0.25 mm was made by the same process as in the fourth preferred embodiment except that a starting wire rod material of diameter 5.5 mm and chemical composition, by wt %, C: 0.72, Si: 0.23, Mn: 0.53 and a remainder of Fe and unavoidable impurities was used as the starting material. At this time, another steel wire was then made with different conditions of the final continuous wet drawing, and then steel cords of 2+1 structure according to the invention were made out of each of these steel wires. These are Samples 47 and 48 respectively.

2) Also, a steel wire of conventional strength was made by a conventional method using the same starting wire rod material (C: 0.72 wt %) and a cord was made with this steel wire. This is Sample 50.

Further, a high tensile steel wire and a steel cord (comparison examples) were made by a conventional method using the same wire rod material (C: 0.83 wt %) as for Sample 45 of the fourth preferred embodiment. This is Sample 49.

The manufacturing conditions and steel wire and cord characteristics of these samples are shown in Table 9.

Sixth Preferred Embodiment

1) Using the same wire rod material (C: 0.72 wt %) as in Samples 47 and 48 in the fifth preferred embodiment described above, a 0.32 mm diameter steel wire and a 2+1 steel cord according to the invention made from this steel wire were made. These are Samples 51 and 52. Also, using the same starting wire rod material as for Sample 47, a steel wire and cord (conventional examples) of conventional strength were made by a conventional method. This is Sample 53.

The manufacturing conditions and steel wire characteristics and cord characteristics of these samples are shown in Table 10.

In Table 8 through Table 10, 'Torsion Test' refers to a toughness test wherein the chuck spacing L between the fixed side chuck 6 and the moving side chuck 7 of FIG. 2 is made 300d (d being the steel wire diameter) and with a straight steel wire W gripped by the chucks (in the case of steel wires having been twisted, the twisting of the cord was undone but no particular processing such as straightening of the wire by hand was carried out) a tension is lightly applied by a 400 gr weight being suspended from the fixed side, the moving side chuck 7 is turned by the motor 9 at a twisting speed of 30 rpm in one direction and a torsion-torque curve until the wire breaks is taken and used to determine toughness, and a test wherein after twisting through ten turns in one direction the rotation is stopped and then the steel wire is twisted back in the opposite direction at the same twisting speed until the wire breaks, and a torsion-torque curve until the wire breaks is taken and used to determine toughness.

As is clear from Table 8 through Table 10, Samples 37 to 41, Samples 47 to 48 and Samples 51 to 52, which are embodiments of the invention, have characteristics of breaking load, twisting efficiency, rubber penetration and fatigue resistance all about the same as or better than those of Samples 45 and 49, which were made using a starting wire rod material containing over 0.80 wt % carbon. These embodiments of the invention are also superior in all their characteristics to Samples 46, 50 and 53, which are conventional examples.

On the other hand, with Samples 42 to 44, which are comparison examples, the toughness in the forward-reverse torsion test was not good, the post-twisting/pre-twisting strength ratio was also low and although the rubber penetration was satisfactory the fatigue resistance was poor.

In the torsion-torque curves of the torsion tests, the curves of the steel wires before being twisted into cords and the steel wires after having being twisted into cords were substantially the same; steel wires which were not good before being twisted were also not good after having being twisted, and there was no recovery of toughness resulting from twisting.

As is clear from the fourth to sixth preferred embodiments, steel cords of 2+1 structure according to the invention have good rubber penetration. Furthermore, notwithstanding that they were made using an inexpensive starting material of ordinary carbon content, the steel wires have high strength and good toughness and are also as good as conventional steel wires in their twisting efficiency. Also, because their fatigue resistance is particularly superior, the highly valuable benefit is obtained that their reinforcing effect on rubber is excellent.

Potential for Industrial Use

As well as being ideal as means for reinforcing radial tires for vehicles, steel filament members according to this invention can also be used as means for reinforcing various other rubber products such as conveyor belts and high-pressure hoses.

TABLE 1

| Division | Item | Sample 1 | Sample 2 | Sample 3 | Sample 4 | Sample 5 | Sample 6 | Sample 7 |
|---|---|---|---|---|---|---|---|---|
| Characteristics of Steel Wire (0.25 mm φ) | Tensile Strength (N/mm$^2$) | 3,344 | 3,256 | 3,285 | 3,148 | 3,285 | 3,324 | 3,187 |
| | One-way Torsion Test Result | ○ | ○ | ○ | ○ | ○ | x | ○ |
| | Forward-Reverse Torsion Test Result | ○ | ○ | ○ | x | x | x | ○ |
| | Fatigue Limit (N/mm$^2$) | 981 | 981 | 981 | 883 | 883 | 785 | 932 |
| Final Wet Drawing Conditions | *1 Approach Angle (°) | 8 | 10 | 10 | 10 | 10 | 10 | 12 |
| | Bearing Length | 0.3 d$_1$ | 0.3 d$_1$ | 0.3 d$_1$ | 0.3 d$_1$ | 0.3 d$_1$ | 0.3 d$_1$ | 0.5 d$_1$ |
| | No. of Diamond Nib Dies Used | 6 | 6 | 4 | 4 | 6 | 6 | 0 |
| | Skin Pass Area Percentage Reduction (%) | 2.0 | 2.0 | 2.0 | 2.0 | 5.0 | — | — |
| | Finished Wire Temperature (° C.) | 143 | 140 | 140 | 142 | 143 | 164 | — |

*1 — Die

In the Tables, under 'Torsion Test Result', a ○ indicates that the torque decrease factor was 7% or below (good), and a x indicates that the torque decrease factor was 8% or over (not good).

The 'Rubber Penetration' was determined by making a sample by embedding a single straight cord in unvulcanized rubber under a tension of 100 gr, and vulcanizing the rubber and then removing the cord from inside the rubber, breaking up the steel cord in its length direction and visually observing the degree of penetration of rubber to inside the cord, with a cord into which the rubber penetrates completely being taken as 100%.

The 'Fatigue Resistance Index' is as explained with reference to the first to third preferred embodiments.

TABLE 2

| Sample | Sample 8 | Sample 9 | Sample 10 | Sample 11 | Sample 12 | Sample 13 |
|---|---|---|---|---|---|---|
| Twisting Performance | ○ | ○ | ○ | Δ | x | ○ |
| Breaking Load (N) | 631 | 616 | 618 | 613 | 599 | 598 |
| Fatigue Resistance | 103 | 101 | 101 | 96 | 87 | 100 |

TABLE 3

| Division | Item | Sample 14 | Sample 15 | Sample 16 | Sample 17 | Sample 18 | Sample 19 | Sample 20 | Sample 21 |
|---|---|---|---|---|---|---|---|---|---|
| Characteristics of Steel Wire (0.30 mm φ) | Tensile Strength (N/mm$^2$) | 3,197 | 3,217 | 3,197 | 3,285 | 3,364 | 3,216 | 3,324 | 3,226 |
| | One-way Torsion Test Result | ○ | ○ | ○ | ○ | ○ | ○ | x | ○ |
| | Forward-Reverse Torsion Test Result | ○ | ○ | ○ | ○ | ○ | x | x | ○ |
| | Fatigue Limit (N/mm$^2$) | 932 | 932 | 932 | 932 | 981 | 834 | 785 | 932 |
| Final Wet Drawing Conditions | *1 Approach Angle (°) | 10 | 10 | 10 | 10 | 10 | 10 | 10 | 12 |
| | Bearing Length | 0.3 d$_1$ | 0.3 d$_1$ | 0.3 d$_1$ | 0.3 d$_1$ | 0.3 d$_1$ | 0.3 d$_1$ | 0.3 d$_1$ | 0.5 d$_1$ |
| | No. of Diamond Nib Dies Used | 4 | 4 | 4 | 4 | 4 | 4 | 4 | 0 |
| | Skin Pass Area Percentage Reduction (%) | 2.5 | 3.5 | 3.0 | 3.0 | 3.0 | 4.5 | — | — |
| | Finished Wire Temperature (° C.) | 143 | 144 | 143 | 145 | 147 | 145 | 173 | — |

*1 — Die

TABLE 4

| Sample | Sample 22 | Sample 23 | Sample 24 | Sample 25 | Sample 26 |
|---|---|---|---|---|---|
| Twisting Performance | ○ | ○ | Δ | x | ○ |
| Breaking Load (N) | 433 | 450 | 421 | 428 | 433 |
| Fatigue Resistance | 100 | 102 | 90 | 82 | 100 |

TABLE 5

| Division | Item | Sample 27 | Sample 28 |
|---|---|---|---|
| Characteristics of Steel Wire (0.20 mm φ) | Tensile Strength (N/mm$^2$) | 3,354 | 3,256 |
| | One-way Torsion Test Result | ○ | ○ |
| | Forward-Reverse Torsion Test Result | ○ | ○ |
| | Fatigue Limit (N/mm$^2$) | 1,079 | 1,079 |
| Final Wet Drawing Conditions | *1 Approach Angle (°) | 10 | 12 |
| | Bearing Length | 0.3 d$_1$ | 0.5 d$_1$ |
| | No. of Diamond Nib Dies Used | 4 | 0 |
| | Skin Pass Area Percentage Reduction (%) | 2.0 | — |
| | Finished Wire Temperature (° C.) | 132 | — |

*1 — Die

TABLE 6

| Division | Item | Sample 29 | Sample 30 | Sample 31 | Sample 32 |
|---|---|---|---|---|---|
| Characteristics of Steel Wire (0.35 mm φ) | Tensile Strength (N/mm$^2$) | 3,050 | 3,099 | 3,197 | 3,060 |
| | One-way Torsion Test Result | ○ | ○ | x | ○ |
| | Forward-Reverse Torsion Test Result | ○ | x | x | x |
| | Fatigue Limit (N/mm$^2$) | 834 | 735 | 686 | 834 |
| Final Wet Drawing Conditions | *1 Approach Angle (°) | 10 | 10 | 10 | 12 |
| | Bearing Length | 0.3 d$_1$ | 0.5 d$_1$ | 0.3 d$_1$ | 0.5 d$_1$ |
| | No. of Diamond Nib Dies Used | 4 | 4 | 4 | 0 |
| | Skin Pass Area Percentage Reduction (%) | 2.0 | 5.0 | — | — |
| | Finished Wire Temperature (° C.) | 146 | 148 | 182 | — |

*1 — Die

TABLE 7

| Sample | Sample 33 | Sample 34 | Sample 35 | Sample 36 |
|---|---|---|---|---|
| Twisting Performance | ○ | Δ | x | ○ |
| Breaking Load (N) | 1,972 | 1,953 | 1,952 | 1,965 |
| Fatigue Resistance | 102 | 91 | 83 | 100 |

TABLE 8

| Item | | Sample 37 | Sample 38 | Sample 39 | Sample 40 | Sample 41 | Sample 42 | Sample 43 | Sample 44 | Sample 45 | Sample 46 |
|---|---|---|---|---|---|---|---|---|---|---|---|
| *2 | Tensile Strength (N/mm$^2$) | 3,138 | 3,138 | 3,197 | 3,344 | 3,344 | 3,236 | 3,177 | 3,423 | 3,158 | 2,873 |
|  | One-way Torsion Test Result | ○ | ○ | ○ | ○ | ○ | ○ | ○ | x | ○ | ○ |
|  | Forward-Reverse Torsion Test Result | ○ | ○ | ○ | ○ | ○ | x | x | x | ○ | ○ |
| *4 *1 | Approach Angle (°) | 10 | 10 | 10 | 8 | 8 | 10 | 10 | 12 | 12 | 12 |
|  | Bearing Length | 0.3 d$_1$ | 0.3 d$_1$ | 0.3 d$_1$ | 0.3 d$_1$ | 0.3 d$_1$ | 0.3 d$_1$ | 0.3 d$_1$ | 0.5 d$_1$ | 0.5 d$_1$ | 0.5 d$_1$ |
|  | Skin Pass Area Percentage Reduction (%) | 1.5 | 1.5 | 2.5 | 3.0 | 3.0 | 5.0 | 1.0 | 2.5 | — | — |
|  | No. of Diamond Nib Dies Used | 4 | 4 | 4 | 5 | 5 | 5 | 4 | 4 | 0 | 0 |
| *3 | Twisting Pitch (mm) | 12.5 | 14.0 | 14.0 | 16.0 | 18.0 | 12.5 | 14.0 | 16.0 | 14.0 | 14.0 |
|  | Breaking Load (N) | 544 | 549 | 559 | 587 | 591 | 555 | 540 | 575 | 551 | 503 |
|  | Twisting Efficiency (%) | 93.9 | 94.8 | 94.6 | 95.1 | 95.7 | 92.8 | 92.1 | 90.9 | 84.5 | 94.8 |
|  | Rubber Penetration (%) | 80 | 85 | 90 | 90 | 85 | 75 | 85 | 90 | 85 | 85 |
|  | Fatigue Resistance | 162 | 155 | 158 | 147 | 142 | 96 | 93 | 91 | 131 | 100 |
|  | Steel Wire Forward-Reverse Torsion Test Result | ○ | ○ | ○ | ○ | ○ | x | x | x | ○ | ○ |

*1 — Die,
*2 — Steel Wire,
*3 — Steel Cord,
*4 — Wet Drawing Conditions

TABLE 9

| Item | | Sample 47 | Sample 48 | Sample 49 | Sample 50 |
|---|---|---|---|---|---|
| *2 | Tensile Strength (N/mm$^2$) | 3,373 | 3,256 | 3,207 | 2,962 |
|  | One-way Torsion Test Result | ○ | ○ | ○ | ○ |
|  | Forward-Reverse Torsion Test Result | ○ | ○ | ○ | ○ |
| *4 *1 | Approach Angle (°) | 8 | 10 | 12 | 12 |
|  | Bearing Length | 0.3 d$_1$ | 0.3 d$_1$ | 0.5 d$_1$ | 0.5 d$_1$ |
|  | Skin Pass Area Percentage Reduction (%) | 2.5 | 2.5 | — | — |
|  | No. of Diamond Nib Dies Used | 4 | 4 | 0 | 0 |
| *3 | Twisting Pitch (mm) | 10.5 | 12.5 | 12.5 | 12.5 |
|  | Breaking Load (N) | 474 | 461 | 451 | 417 |
|  | Twisting Efficiency (%) | 95.3 | 96.1 | 95.5 | 95.6 |
|  | Rubber Penetration (%) | 80 | 90 | 85 | 80 |
|  | Fatigue Resistance | 166 | 154 | 126 | 100 |
|  | Steel Wire Forward-Reverse Torsion Test Result | ○ | ○ | ○ | ○ |

*1 — Die
*2 — Steel Wire,
*3 — Steel Cord,
*4 — Wet Drawing Conditions

TABLE 10

| Item | | Sample 51 | Sample 52 | Sample 53 |
|---|---|---|---|---|
| *2 | Tensile Strength (N/mm$^2$) | 3,099 | 3,128 | 2,775 |
|  | One-way Torsion Test Result | ○ | ○ | ○ |
|  | Forward-Reverse Torsion Test Result | ○ | ○ | ○ |
| *4 *1 | Approach Angle (°) | 10 | 10 | 12 |
|  | Bearing Length | 0.3 d$_1$ | 0.3 d$_1$ | 0.5 d$_1$ |
|  | Skin Pass Area Percentage Reduction (%) | 2.0 | 3.0 | — |
|  | No. of Diamond Nib Dies Used | 4 | 4 | 0 |
| *3 | Twisting Pitch (mm) | 14.0 | 16.0 | 16.0 |
|  | Breaking Load (N) | 701 | 712 | 633 |
|  | Twisting Efficiency (%) | 93.8 | 94.3 | 94.5 |
|  | Rubber Penetration (%) | 80 | 80 | 80 |
|  | Fatigue Resistance | 157 | 148 | 100 |
|  | Steel Wire Forward-Reverse Torsion Test Result | ○ | ○ | ○ |

*1 — Die
*2 — Steel Wire,
*3 — Steel Cord,
*4 — Wet Drawing Conditions

What is claimed is:

1. A radial tire for a car comprising a belt part and a steel cord used to reinforce the belt part,
wherein said steel cord has a steel cord strength and is made by a method comprising bundling two steel wires together substantially in parallel to each other and winding another steel wire around the two steel wires substantially in parallel to each other,
a ratio of the steel cord strength to an aggregate strength of all of said steel wires before being combined to form the steel cord is not less than 0.935,
said steel wire is made by a method comprising heat-treating and plating a carbon steel wire rod starting material containing 0.70 to 0.75% carbon to form heat-treated and plated wire rod starting material and subsequently drawing the heat-treated and plated wire rod starting material to form said steel wire so that said steel wire has a diameter of from 0.10 to 0.40 mm, a tensile strength (Y) in N/mm$^2$ according to the following equation I:

$$Y \geq -(1960\ N/mm^3)\ d + 3580\ N/mm^2, \quad (I)$$

d is the diameter in mm, and a torque decrease factor of less than 7% in a torsion-torque curve as measured in a torsion-torque test in which the steel wire is twisted forward and then reverse twisted.

2. A high tensile steel wire for rubber product reinforcement, said high tensile steel wire being made by a method comprising heat-treating and plating a carbon steel wire rod material containing 0.70 to 0.75% carbon and subsequently drawing the heat-treated and plated carbon steel wire rod to form the steel wire, wherein the steel wire has a diameter of from 0.10 to 0.40 mm, a tensile strength (Y) in N/mm² not less than a lower limit given by the following equation I:

$$Y \geq -(1960 \ N/mm^3) \ d + 3580 \ N/mm^2 \qquad (I),$$

wherein d is the diameter in mm, and a torque decrease factor of less than 7% in a torsion-torque curve as measured in a torsion torque test in which the steel wire is twisted forward and then reverse twisted.

3. The steel wire as defined in claim 2, wherein the heat treating comprises heating to from 900 to 960° C. for a predetermined time to form austenite and then performing a patenting treatment to quench the steel wire and thus form a pearlite structure.

4. A steel cord for reinforcement of rubber products, said steel cord being made by a method comprising bundling two steel wires together substantially in parallel to each other and winding another steel wire around the two steel wires substantially in parallel to each other, wherein a ratio of a steel cord strength to an aggregate strength of all of said steel wires before being twisted together to form the steel cord is not less than 0.935, and wherein the steel wire is high tensile steel wire for rubber product reinforcement, said high tensile steel wire being made by a method comprising heat-treating and plating a carbon steel wire rod material containing 0.70 to 0.75% carbon and subsequently drawing the heat-treated and plated carbon steel wire rod to form the steel wire, wherein the steel wire has a diameter of from 0.10 to 0.40 mm, a tensile strength (Y) in N/mm² not less than a lower limit given by the following equation I:

$$Y \geq -(1960 \ N/mm^3) \ d + 3580 \ N/mm^2 \qquad (I),$$

wherein d is the diameter in mm, and a torque decrease factor of less than 7% in a torsion-torque curve as measured in a torsion torque test in which the steel wire is twisted forward and then reverse twisted.

5. A steel cord according to claim 4 of a 1×n structure.

6. A steel cord according to claim 4 of an n+m structure.

7. A steel cord according to claim 4 comprising a 1×n structure as a core and a plurality of steel wires twisted around this core.

8. A steel cord according to claim 4 wherein:
with respect to the diameter d (mm) of the steel wires, the cord twisting pitch is 40d to 65d.

9. A method of producing a high tensile steel wire for rubber product reinforcement, said method comprising the steps of:

a) heat-treating and plating a carbon steel wire rod starting material containing 0.70 to 0.75% carbon to form a heat-treated and plated starting wire;

b) after step a), wet drawing the starting wire through a first drawing die whose approach angle (2α) is from 8 to 10° and whose bearing length is $0.3d_1$, wherein $d_1$=a drawing hole diameter of the first drawing die; and c) after step b), finally drawing the starting wire through a double die including another drawing die and an exit-side drawing die lined up in series, wherein said exit-side drawing die provides a skin pass with a drawing area percentage reduction of from 1.2 to 3.9%, at least said drawing dies of said double die have sintered diamond nibs and a remainder of said drawing dies have alloy nibs; and d) controlling a temperature of said steel wire immediately after passing through a final downstream one of said drawing dies so that said temperature is under 150° C., and wherein said steel wire has a diameter of from 0.10 to 0.40 mm, a tensile strength (Y) in N/mm² according to the following equation I:

$$Y \geq -(1960 \ N/mm^3)d + 3580 \ N/mm^2 \qquad (I),$$

where d is the diameter in mm, and a torque-decrease factor of less than 7% in a torsion-torque curve as measured in a torsion torque test in which said steel wire is twisted forward and then reverse twisted.

* * * * *